June 2, 1936.  A. J. MEYER  2,043,111
ENGINE
Filed May 14, 1931
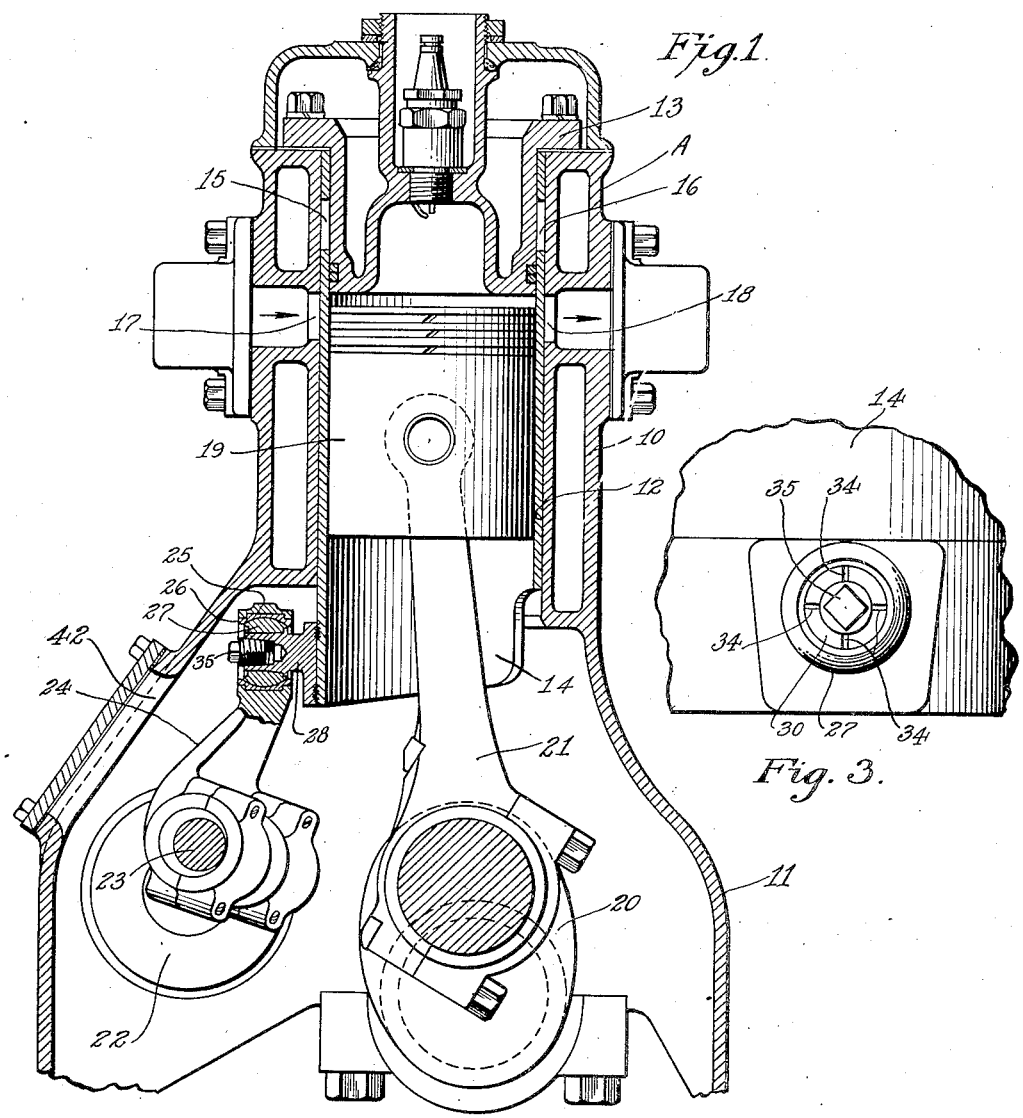
Fig.1.
Fig.3.
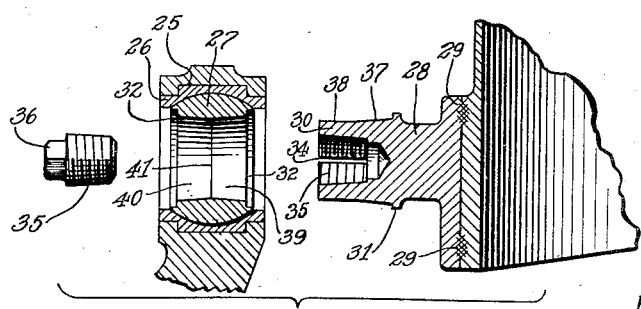
Fig.2
INVENTOR.
Andre J. Meyer
BY
ATTORNEY.

Patented June 2, 1936

2,043,111

UNITED STATES PATENT OFFICE 2,043,111

ENGINE

Andre J. Meyer, Detroit, Mich., assignor to Continental Motors Corporation, Detroit, Mich., a corporation of Virginia Application May 14, 1931, Serial No. 537,275

7 Claims. (Cl. 287—87)

This invention relates to engines and refers more particularly to sleeve valve engines. In this type of engine one or more sleeve valves for each engine cylinder are driven by a suitable mechanism for controlling the engine intake and exhaust.

My said invention is illustrated in reference to the Burt-McCollum type of engine in which a single sleeve valve is moved in a combined reciprocating and oscillating movement and in which the sleeve is connected to a driving link or element by a ball and socket assembly permitting the aforesaid sleeve movement.

In its more specific aspects my said invention relates to an improved ball and socket assembly and has among it objects to provide improved means for holding or locking the parts in assembled relation. Heretofore difficulty has been experienced in preventing the parts of the assembly from developing excessive clearance and from encountering difficulties in getting at the parts for purposes of inspection or replacement.

A further object of my invention resides in a novel construction and means whereby the aforesaid difficulties are removed. My improvements provide a construction capable of manufacture at low cost with improved accessibility when assembled.

Further objects and advantages of my invention will be apparent from this specification describing one embodiment thereof in detail, reference being made to the accompanying drawing in which:

Figure 1 is a sectional elevation view through the engine,

Figure 2 is a detail view showing the parts of the ball assembly, and

Figure 3 is an end detail view of the ball and socket assembly.

Referring to the drawing, reference character A refers to the engine of the aforesaid type wherein 10 is the cylinder block and 11 the crankcase, the block 10 having cylinder 12 formed therein and closed at one end by a cylinder head 13. A sleeve valve 14 is operatively associated with cylinder 12, sleeve ports 15, 16 cooperating in the well known manner with corresponding cylinder ports 17, 18 for engine intake and exhaust respectively. The usual piston 19 operates crankshaft 20 through the connecting rod 21.

For driving the sleeve valve 14 I have shown the layshaft 22, adapted to be driven at half speed from the crankshaft, provided with wobble crank 23 which actuates link or element 24. This link has an opening 25 at its upper end within which and to which is secured the spherical socket 26. Within the socket is located the ball 27 which provides for universal movement with socket 26. This ball and socket assembly is thus preferably carried by link 24 and my invention provides for improved means for connecting this assembly with sleeve 14.

The sleeve 14 has a driving lug 28 secured thereto as by welding at 29 and extends generally perpendicularly to the sleeve axis to form the hollow expanding hub 30. This hub has an annular shoulder 31 locating the ball 27 axially of the hub, the ball having a complementary recess 32 preferably at each end thereof for engagement with shoulder 31. By providing shoulder 31 at each end of the ball, the latter may be assembled at either end and is therefore reversible. Hub 30 has an axial tapered threaded bore 33 longitudinally slotted at 34 to permit expansion thereof by engagement with wedging means in the form of a tapered threaded plug 35, the latter having a flattened head 36 for engagement with a wrench. Hub 30 is formed with a small amount of taper 37 extending forwardly and inwardly from shoulder 31 to substantially the mid-section of the portion of the hub forwardly of shoulder 31, the remainder of the hub being cylindrical at 38 in the position of the parts before assembly as in Figure 2. Ball 27 has a bore provided with tapers 39, 40 extending longitudinally inwardly and outwardly thereof from substantially the mid-section 41, these tapers corresponding to the taper of lug 28 at 37.

In assembling the parts, the ball 27 is inserted on lug 28, the ball including link 24 and socket 26 in the embodiment illustrated, tapers 39 and 37 fitting closely together with recess 32 engaging shoulder 31. Plug 35 is then threaded into opening 33 thereby expanding the cylindrical portion 38 of the lug until it fits the surface 40, this distortion firmly holding the parts against accidental release and still permitting removal of the parts by unscrewing plug 35.

The tapered surfaces 37, 39 and 40 may be termed "fixed" as distinguished from the cylindrical surface 38 which is expanded into tapered condition for fitting the fixed taper 40.

It will be noted that I have avoided the usual expedient of an assembly capable of developing play and wear between the lug 28 and ball 27, the latter in my invention being firmly clamped against any movement on the lug. At the same time the head 36 of the plug extends into convenient position for access adjacent crankcase 11 through opening 42 thereof should it be necessary to disassemble the parts from the sleeve valve.

While I have illustrated one form of my invention it is not my intention to liimt my invention to the particular construction and arrangement of parts shown as various modifications thereof will be readily suggested from the teachings of my invention as set forth in the appended claims.

What I claim as my invention is:

1. In a sleeve valve mechanism for sleeve valve engines in which the sleeve is provided with a driving lug having an external substantially cylindrical surface portion and a tapered surface portion, said lug having a member attached thereto by a releasable joint, said member provided with a bore tapered for engagement with the surface portions of said lug, said releasable joint between the member and driving lug including means expanding the cylindrical surface portion of said lug into clamping engagement with the tapered surface portions of the member.

2. In a sleeve valve mechanism for sleeve valve engines in which the sleeve is provided with a driving lug having an external substantially cylindrical surface portion and a tapered surface portion, said lug having a member attached thereto by a releasable joint, said member provided with a bore tapered for engagement with the surface portions of said lug, said releasable joint between the member and driving lug including means expanding the cylindrical surface portion of said lug into clamping engagement with the tapered surface portions of the member, said lug being slotted to impart flexing characteristics thereto.

3. In a sleeve valve mechanism for sleeve valve engines in which the sleeve is provided with a driving lug having an external substantially cylindrical surface portion and a tapered portion, said lug having a ball provided with a bore for receiving the driving lug and attached to said lug by a releasable joint, the bore of said ball having tapered surfaces extending outwardly in opposite directions from substantially the mid-section thereof, the tapered surface portion of the lug seating on one of the said tapered surfaces of said bore, said releasable joint including means for expanding said lug to seat the cylindrical surface thereof with the other of said bore tapered surfaces.

4. In a sleeve valve mechanism for sleeve valve engines in which the sleeve is provided with a driving lug having an external substantially cylindrical surface portion and a tapered portion, said lug having a ball provided with a bore for receiving the driving lug and attached to said lug by a releasable joint, the bore of said ball having tapered surfaces extending outwardly in opposite directions from substantially the mid-section thereof, the tapered surface portion of the lug seating on one of the said tapered surfaces of said bore, said releasable joint including means for expanding said lug to seat the cylindrical surface thereof with the other of said bore tapered surfaces, said means including a tapered plug threadedly engaging the lug.

5. In a sleeve valve mechanism for sleeve valve engines in which the sleeve is provided with a driving lug having an external substantially cylindrical surface portion and a tapered portion, said lug having a ball provided with a bore for receiving the driving lug and attached to said lug by a releasable joint, the bore of said ball having tapered surfaces extending longitudinally outwardly in both directions from substantially the mid-section thereof, the tapered surface portion of the lug seating on one of the said tapered surfaces of said bore, said releasable joint including means for expanding said lug to seat the cylindrical surface thereof with the other of said bore tapered surfaces, said means including a tapered plug threadedly engaging the lug, said lug being slotted longitudinally thereof to impart flexing characteristics thereto.

6. In a sleeve valve mechanism for sleeve valve engines in which the sleeve is provided with a driving lug having an external substantially cylindrical surface portion and a tapered portion, said lug having a ball provided with a bore for receiving the driving lug and attached to said lug by a releasable joint, the bore of said ball having tapered surfaces extending longitudinally outwardly in both directions from substantially the mid-section thereof, the tapered surface portion of the lug seating on one of the said tapered surfaces of said bore, said releasable joint including means for expanding said lug to seat the cylindrical surface thereof with the other of said bore tapered surfaces, said lug being provided with a shoulder engaged by said ball to locate the ball longitudinally in position on the lug.

7. In a sleeve valve mechanism for sleeve valve engines in which the sleeve is provided with a driving lug having a ball attached thereto by a releasable joint and a driving member is provided with a socket universally seating the ball, said ball having an axial bore reversely tapered and said lug being tapered to fit one of the tapers of said bore, said releasable joint between the ball and driving lug comprising clamping means cooperating with the other of said bore tapers.

ANDRE J. MEYER.